United States Patent
Dunne et al.

(10) Patent No.: US 11,238,088 B2
(45) Date of Patent: Feb. 1, 2022

(54) VIDEO MANAGEMENT SYSTEM

(71) Applicant: International Business Machines Corporation, Armonk, NY (US)

(72) Inventors: Jonathan D. Dunne, Dungarvan (IE); Nadiya Kochura, Bolton, MA (US); Alexandre Bonstrom, Belmont, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 16/565,547

(22) Filed: Sep. 10, 2019

(65) Prior Publication Data

US 2021/0073260 A1    Mar. 11, 2021

(51) Int. Cl.
| | | |
|---|---|---|
| *G06F 16/432* | (2019.01) | |
| *G06F 16/435* | (2019.01) | |
| *G06F 16/438* | (2019.01) | |
| *H04N 21/845* | (2011.01) | |
| *G06F 16/483* | (2019.01) | |

(52) U.S. Cl.
CPC ......... *G06F 16/432* (2019.01); *G06F 16/435* (2019.01); *G06F 16/438* (2019.01); *G06F 16/483* (2019.01); *H04N 21/8456* (2013.01)

(58) Field of Classification Search
CPC ..... G06F 16/432; G06F 16/435; G06F 16/438
USPC ....................................................... 707/706
See application file for complete search history.

(56) References Cited

U.S. PATENT DOCUMENTS

| | | |
|---|---|---|
| 9,715,901 B1 | 7/2017 | Singh et al. |
| 9,930,413 B2 | 3/2018 | Schmidt et al. |
| 2010/0183280 A1 | 7/2010 | Beauregard et al. |
| 2011/0292244 A1 | 12/2011 | Deever |
| 2015/0067739 A1 | 3/2015 | Kelley et al. |
| 2015/0074112 A1* | 3/2015 | Liu ..................... G06F 40/205 707/739 |
| 2016/0371992 A1* | 12/2016 | Kozloski ............... G09B 5/02 |
| 2018/0367857 A1 | 12/2018 | Wittke |
| 2019/0096438 A1 | 3/2019 | Nir et al. |
| 2019/0191200 A1 | 6/2019 | Panchaksharaiah et al. |
| 2021/0064648 A1* | 3/2021 | Farri ..................... G06F 16/44 |

* cited by examiner

*Primary Examiner* — Kimberly L Wilson
(74) *Attorney, Agent, or Firm* — Timothy J. Singleton

(57) ABSTRACT

A method, system, and computer program product for creating step-based answers from multimedia content are provided. The method receives a search query including a set of search terms. A set of question characteristics is determined for the search query. The set of question characteristics are based in part on the set of search terms. The method generates a set of steps for an answer to the search query. The set of steps are generated based in part on the set of question characteristics. The method identifies media content relevant to the set of steps and segments the media content to generate a set of media segments. Each media segment of the set of media segments represent a portion of the media content. The method combines the set of media segments based on the set of steps to generate a media answer to the search query.

14 Claims, 6 Drawing Sheets

VIDEO MANAGEMENT SYSTEM

BACKGROUND

Network resources may contain information useful or desired by users. Users may access such network resources using search engines or search functionality to retrieve information from these network resources. Search engines and functionality often access text-based documents using natural language processing and text analysis operations to match words in a document to keywords of a search query. In searching video or other multimedia content, search engines and functionality often rely on parsing or comparing metadata describing such content in order to match keywords and retrieve relevant search results.

SUMMARY

According to an embodiment described herein, a computer-implemented method for creating step-based answers from multimedia content is provided. The method receives a search query including a set of search terms. A set of question characteristics is determined for the search query. The set of question characteristics are based in part on the set of search terms. The method generates a set of steps for an answer to the search query. The set of steps are generated based in part on the set of question characteristics. The method identifies media content relevant to the set of steps and segments the media content to generate a set of media segments. Each media segment of the set of media segments represent a portion of the media content. The method combines the set of media segments based on the set of steps to generate a media answer to the search query.

According to an embodiment described herein, a system for creating step-based answers from multimedia content is provided. The system includes one or more processors and a computer-readable storage medium, coupled to the one or more processors, storing program instructions that, when executed by the one or more processors, cause the one or more processors to perform operations. The system receives a search query including a set of search terms. A set of question characteristics is determined for the search query. The set of question characteristics are based in part on the set of search terms. The system generates a set of steps for an answer to the search query. The set of steps are generated based in part on the set of question characteristics. The system identifies media content relevant to the set of steps and segments the media content to generate a set of media segments. Each media segment of the set of media segments represent a portion of the media content. The system combines the set of media segments based on the set of steps to generate a media answer to the search query.

According to an embodiment described herein a computer program product for creating step-based answers from multimedia content is provided. The computer program product receives a search query including a set of search terms. A set of question characteristics is determined for the search query. The set of question characteristics are based in part on the set of search terms. The computer program product generates a set of steps for an answer to the search query. The set of steps are generated based in part on the set of question characteristics. The computer program product identifies media content relevant to the set of steps and segments the media content to generate a set of media segments. Each media segment of the set of media segments represent a portion of the media content. The computer program product combines the set of media segments based on the set of steps to generate a media answer to the search query.

DETAILED DESCRIPTION

Figure 1:
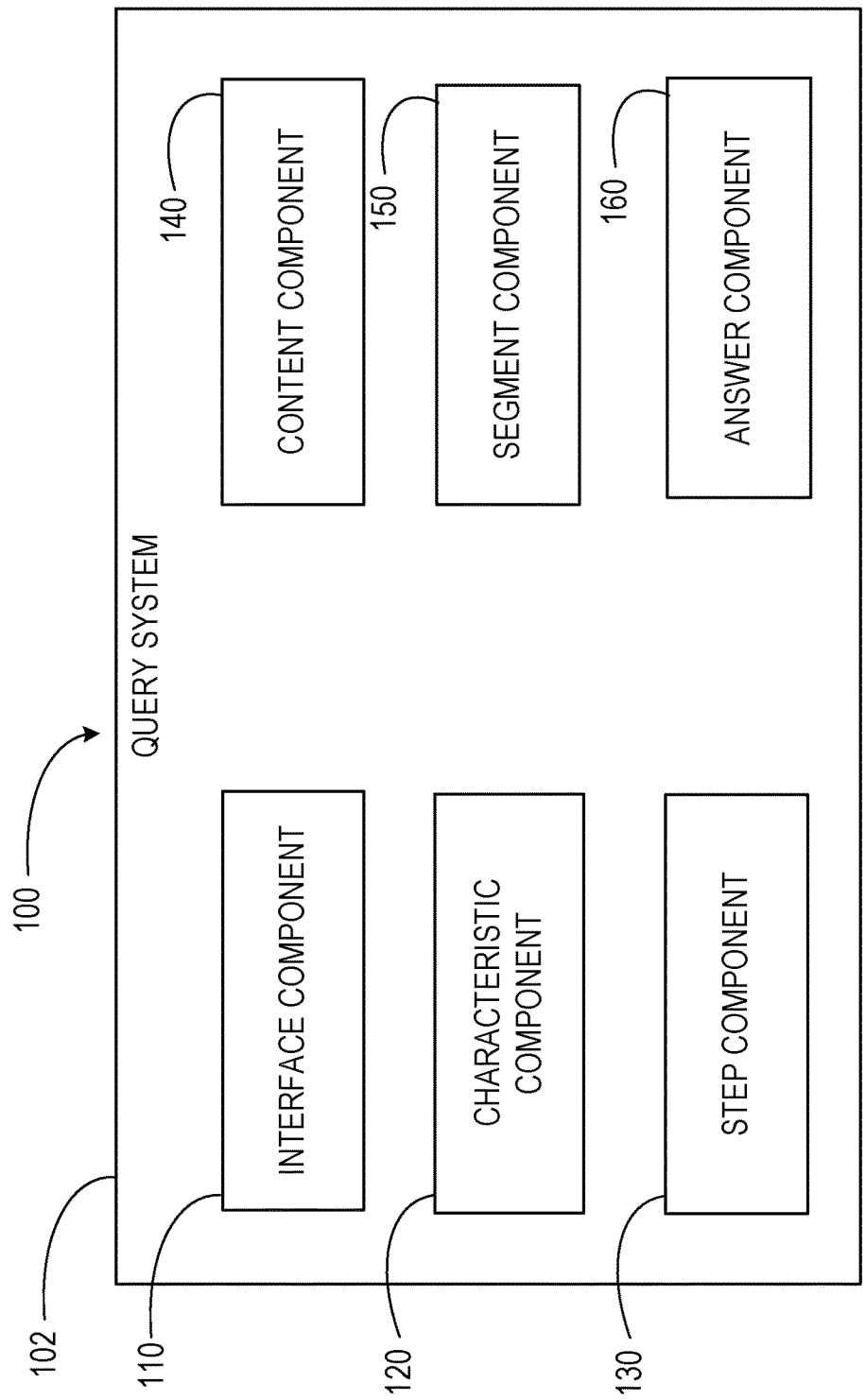
FIG. 1 depicts a block diagram of a computing environment for implementing concepts and computer-based methods, according to at least one embodiment.

The present disclosure relates generally to methods for generating search results, but not exclusively, to a computer-implemented method for creating step-based answers to search queries from multimedia content. The present disclosure relates further to a related system for search result generation, and a computer program product for operating such a system.

With the advent of the internet and network-based resources, differing types of media and information are increasingly available to users of search systems. Often search systems use keyword matching to surface results to search queries. Keyword matching search systems work well for search queries which are little more than a cluster of keywords. Some search systems use natural language processing on sentence-based search queries to generate a set of keywords used to retrieve search results. However, search systems often encounter difficulties in retrieving distinct pieces of information where video, audio, and other multimedia resources are accessed during a search. Search systems based on keyword matching often have difficulty in interpreting different types of search queries and an intent of a user relating to the search query. Further, search systems often encounter difficulties in finding distinct pieces of information to complete tasks based on search queries intended to determine procedural information. For example, search engines often have difficulty in finding step by step instructions from one or more video clips distributed across available network resources.

Embodiments of the present disclosure provide methods, systems, and computer program products for creating step-based answers from multimedia content. Some embodiments of the present disclosure enable automated task determinations from search queries. Such task determinations may be based on the search query, user profiles, user skill levels, combinations thereof, and other suitable and relevant information regarding one or more of the user and the search query. Some embodiments of the present disclosure identify relevant portions of one or more multimedia resources, extract the relevant portions of data, and generate new multimedia presentations to address received search queries. These new multimedia presentations may be generated and presented in a manner relative to the search query, a knowledge level of a user, and a skill level of a user. As such, the present disclosure enables extraction and composition of information in logical steps to answer search queries, thereby increasing speed of data acquisition, reducing processing power and processing cycles used to produce desired search results, and improve quality and relevancy of search results.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a query system 102. The query system 102 may comprise an interface component 110, a characteristic component 120, a step component 130, a content component 140, a segment component 150, and an answer component 160. The interface component 110 presents user interface elements, receives search queries, and presents answers to the search query generated by the query system 102. The characteristic component 120 determines question characteristics and user characteristics for use in generating answers relating to received search queries. The step component 130 generates sets of steps for answers to specified search queries. The content component 140 identifies media content relevant to received search queries and sets of steps generated based on the received search queries. The segment component 150 divides or otherwise segments accessed media content to generate sets of media segments. The answer component 160 combines sets of media segments based on sets of steps to generate a media answers to received search queries. Although described with distinct components, it should be understood that, in at least some embodiments, components may be combined or divided, or additional components may be added, without departing from the scope of the present disclosure.

Figure 2:
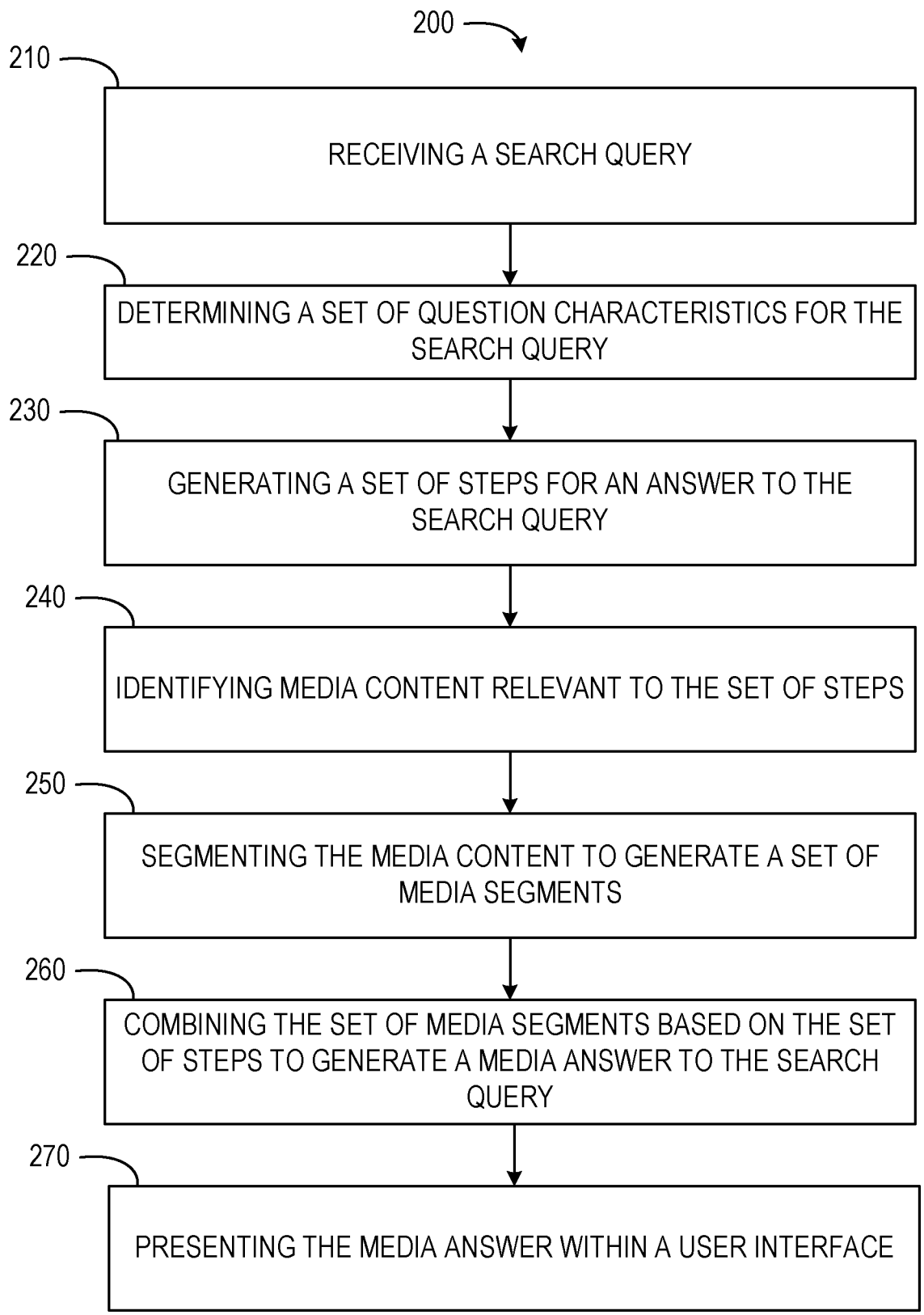
FIG. 2 depicts a flow diagram of a computer-implemented method for creating step-based answers from multimedia content, according to at least one embodiment.

Referring now to FIG. 2, a flow diagram of a computer-implemented method 200 is shown. The computer-implemented method 200 is a method for creating step-based answers from multimedia content. In some embodiments, the computer-implemented method 200 may be performed by one or more components of the computing environment 100, as described in more detail below.

At operation 210, the interface component 110 receives a search query. The search query may be received as a portion of text. When received as text, the search query may be received in the form of a text-based message, a text-based entry into a user interface, text within an image, combinations thereof, or any other suitable text. The search query may also be received as an auditory input. When received in an auditory form, the search query may be received as an audio recording, a microphone input, audio data from a video segment, combinations thereof, or any other suitable input format. The search query may be received as an initiating input or as a response to a prompt. The prompt may be a prompt presented within a user interface, instructing a user to enter a search query or ask a question.

In some embodiments, the search query includes a set of search terms. The search terms may be arranged according to a syntax or other organizational structure. For example, the search query may be received in the form of a question. The question may contain a plurality of terms, a portion of which make up the set of search terms. In such instances, the search query may include a plurality of words. A first portion of the plurality of words may be the set of search terms distributed among the plurality of words according to the syntax. A second portion of the plurality of words may be a set of supporting terms distributed among the plurality of words according to the syntax. The first and second portion of words may define query characteristics. Query characteristics may include a query type, a query topic, a query time frame, a document type, and any other suitable and relevant query characteristics or attributes.

In some embodiments, the search query is received from a user. In such instances, the interface component 110 identifies a profile for the user. The profile of the user may be a social media profile, a local profile, a system profile, combinations thereof, or any other suitable repository of information describing the user. Social media profiles may be accessed by the interface component 110 upon identification of the profile for the user. The social media profiles may describe or include attributes of the user, provided to a social media application by the user, and information relating to social media posts of the user. The local profile may be a profile for the user on a computing device (e.g., a mobile phone, a laptop computer, a tablet, a desktop computer, etc.). The local profile may describe or include attributes of the user, provided to or generated by the computing device based on activities performed on the computing device and information provided thereto. The system profile may be a profile for the user on the query system 102. The system profile may include information provided by the user and determined from activities performed on the query system 102.

Profiles for the user may be based on information provided by the user in an opt-in manner and may be maintained until the user opts-out of the profile or access to a system or device used to create, develop, or maintain the profile. Profiles generated for the user may be governed by data sharing permissions defined by the user to maintain a level of user privacy and/or anonymity desired by the user. The user may access and modify information within the profiles related to the user. Once the user opts-out of the profile, information included in the profile is deleted from the relevant systems or devices storing the profile.

In some embodiments, the characteristic component 120 determines a user skill based on the profile of the user. The user skill may be determined by accessing the profile of the user. The characteristic component 120 may parse or otherwise analyze the profile of the user using one or more techniques of keyword matching, natural language processing, neural networking, convolutional neural networking, machine learning, combinations thereof, or any other suitable and relevant technique capable of identifying one or more skills and a relevant proficiency for each skill.

In some embodiments, the interface component 110 passes information to the characteristic component 120 related to the search query, such as keywords or query characteristics. The characteristic component 120 may determine one or more skill associated with the user which is relevant to the search query. For example, where the interface component 110 passes information indicating a physics query and one or more planet names to the characteristic component 120, the characteristic component may analyze the profile of the user to determine a relevant skill in physics or astrophysics and a relative level of that skill. For example, the characteristic component 120 may determine an education level and area of study for the user to generate a predicted skill level of the user in physics or astrophysics. In some embodiments, the characteristic component 120 determines skills of the user relating to searching or accessing information.

At operation 220, the characteristic component 120 determines a set of question characteristics for the search query. In some embodiments, the set of question characteristics are determined based in part on the set of search terms. The characteristic component 120 may initially determine a question type for the search query. The question type may define a type of information (e.g., a topic) sought by the user. The question type may also define one or more records sought by the user, a type or name of record author, a time frame (e.g., a start time, an end time, a time duration) for the search query or records to be retrieved, combinations thereof, or any other suitable and relevant characteristic or attribute defining or describing the search query.

In some embodiments, the characteristic component 120 determines the set of question characteristics using natural language processing, neural networking, machine learning, or any other suitable analysis methodology. In some embodiments, the characteristic component 120 uses one or more of latent dirichlet allocation (LDA) and biterm topic modeling to determine the set of question characteristics, such as question type or question topic. The characteristic component 120 may also use LDA and biterm topic modeling on the profile of the user to determine skills relevant to the search query and a level of the relevant skill. The characteristic component 120 may use biterm topic modeling to generate a topic model for the search query and the profile of the user.

At operation 230, the step component 130 generates a set of steps for an answer to the search query. In some embodiments, the set of steps are generated based in part on the set of question characteristics. Where the set of steps are generated based on the set of question characteristics, the step component 130 may access a topic model, generated for the search query, and generate the set of steps from the topic model. In embodiments where the characteristic component 120 determines the user skill and skill level, the step component 130 generates the set of steps relative to the user skill. In such instances, the step component 130 accesses a topic model for the search query and a topic model for the user skill and generates the set of steps from the respective topic models. The step component 130 may generate the set of steps as a set of operations used to answer the question of the search query relative to the user's skill level.

At operation 240, the content component 140 identifies media content relevant to the set of steps. The content component 140 may identify the media content by accessing a repository of media content. After accessing the repository, the content component 140 compares metadata in the repository with one or more terms derived from one or more topic models generated for the search query and the user skills. The metadata in the repository describes a set of media content with content keywords. The one or more terms may represent keywords for topics identified by the one or more topic model as describing the search query and the user skills. In some embodiments, the content component 140 uses keyword matching techniques to determine at least one media content which is relevant to the search query and the set of steps.

In some embodiments, the content component 140 identifies a plurality of media content as being relevant to the search query and the set of steps. The content component 140 may determine a relative relevance level for each media content of the plurality of media content. In some embodiments, the relative relevance levels are determined as percentage matches between keywords of the topic model and the metadata for respective media content. The content component 140 may also determine the relative relevance levels by determining a probability value indicating a probability of whether a respective media content, of the plurality of media content, will answer the search query. The content component 140 may select a media content with a highest relative relevance as the identified media content relevant to the set of steps.

At operation 250, the segment component 150 segments the media content to generate a set of media segments. In some embodiments, each media segment of the set of media segments represents a portion of the media content. The media segments may be sections or portions of the media content determined to be relevant to one or more steps of the set of steps. For example, where the media content is a video having a first length (e.g., two hours), each segment may be a shorter portion (e.g., five minutes) of the total video.

In some embodiments, once a media content is selected, the content component 140 triggers the segment component 150. The segment component 150 analyzes the media content to identify at least a portion of the media content to segment. The segment component 150 may analyze the media content using speech-to-text, image recognition, text recognition (e.g., subtitles, metadata, words appearing within the media content, etc.), machine learning, neural networking, combinations thereof, or any other suitable and relevant information extraction method. Based on the topic model or topic models, the segment component 150 identifies within the media content a portion of the media content applicable to at least one step of the set of steps. In some instances, the segment component 150 identifies a portion of the media content for each step of the set of steps. The segment component 150 may segment the media content by extracting, copying, or otherwise separating the identified portions of the media content from remaining portions of the media content.

In some embodiments, the set of media segments represents a first portion of the media content. The first portion of the media content may be relevant to the answer to the search query. A second portion of the media content may be excluded from the set of media segments. The second portion of media content may include aspects, sections, or portions of the media content determined to be irrelevant to the answer. Irrelevancy may be determined where a portion of the media content falls below a relevancy threshold for one or more of the steps of the set of steps. The second portion of the media contents may be excluded from inclusion in the set of media segments.

At operation 260, the answer component 160 combines the set of media segments based on the set of steps to generate a media answer to the search query. The answer component 160 may stitch, link, or otherwise connect the set of media segments together to generate the media answer. The answer component 160 may connect the set of media segments together without intervening portions of the media content. In some embodiments, the set of media segments are combined consecutively into a sequence corresponding to an order for the set of steps to create the media answer. In such embodiments, each step of the set of steps may be numbered or otherwise ordered or arranged to sequentially build the answer to the search query. As each media segment is identified for a respective step of the set of steps, the media segment may be associated with a number or other indication of a position within the sequence.

In embodiments where the first portion of the media content is relevant to the answer and included in the set of media segments and the second portion is determined to fall below the relevancy threshold, the answer component 160 excludes the second portion of the media contents from the media answer.

At operation 270, the interface component 110 presents the media answer within a user interface. In some embodiments, each media segment of the media answer is presented in the sequence corresponding to the order for the set of steps. The interface component 110 may present the media answer in a user interface, such as a multimedia player or application. The interface component 110 may initially present the media answer as a link or representation. The interface component 110 may receive or identify a selection of the link and initiate playback or presentation of the media answer. In some embodiments, once the media answer is generated by the answer component 160, the interface component 110 may generate and insert labels or other indications within the media answer. In such instances, each segment of the set of segments may be labeled indicating a step of the set of steps or a position within the sequence. While presenting the media answer, labels describing each segment may be presented prior to presentation of the respective segment described by the label.

Figure 3:
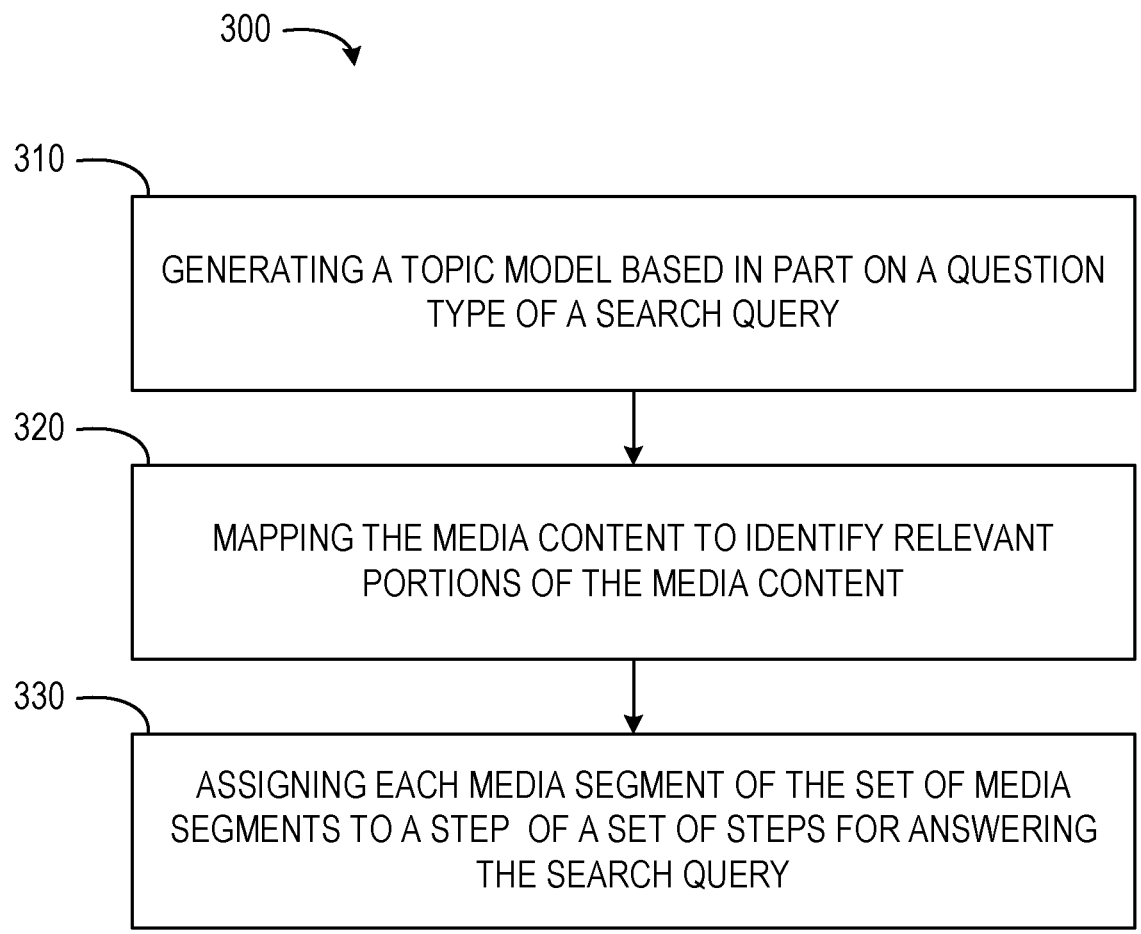
FIG. 3 depicts a flow diagram of a computer-implemented method for creating step-based answers from multimedia content, according to at least one embodiment.

FIG. 3 shows a flow diagram of an embodiment of a computer-implemented method 300 for creating step-based answers from multimedia content. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the characteristic component 120 generates a topic model based in part on a question type of the search query. The question type may be a question characteristic of the set of question characteristics. Question types may represent a topic of the question, a category of the question, or any other question type describing or defining the question. In some embodiments, the characteristic component 120 generates the topic model based on the question type and a user profile. The set of steps for the answer may be generated based on the question type and the topic model.

In operation 320, the content component 140 maps the media content to identify relevant portions of the media content. In some embodiments, the content component 140 maps the media content by comparing terms within the topic model to a media content repository. The media content repository may contain a plurality of distinct media content and metadata describing each media content instance. The content component 140 may map the media content prior to receiving the search query, identifying media content, and segments within each instance of media content, which may be associated or representative of specified terms or keywords. In some embodiments, the content component 140 maps the media content in response to receiving the search query. Once mapped, the content component 140 may retrieve media content (e.g., a video file) determined to be relevant to the search query based on terms, topics, or a query type of the search query.

In operation 330, the segment component 150 assigns each media segment of the set of media segments to a step of the set of steps. In some embodiments, each media segment is assigned to a step based on the media segment being above a threshold level of relevancy for the step. As described above, the segment component 150 may identify each media segment from the selected media content. The segment component 150 may determine a relevancy of each media segment, relative to one or more steps, based on a comparison of the content, topic, keywords, or depictions of the media segment to keywords or topic models for the respective step. The segment component 150 may then separate each media segment from the media content and associate each media segment with a step for which its relevance is determined to be a high or a match. The segment component 150 may then pass the set of media segments to the answer component 160 to generate the media answer.

Figure 4:
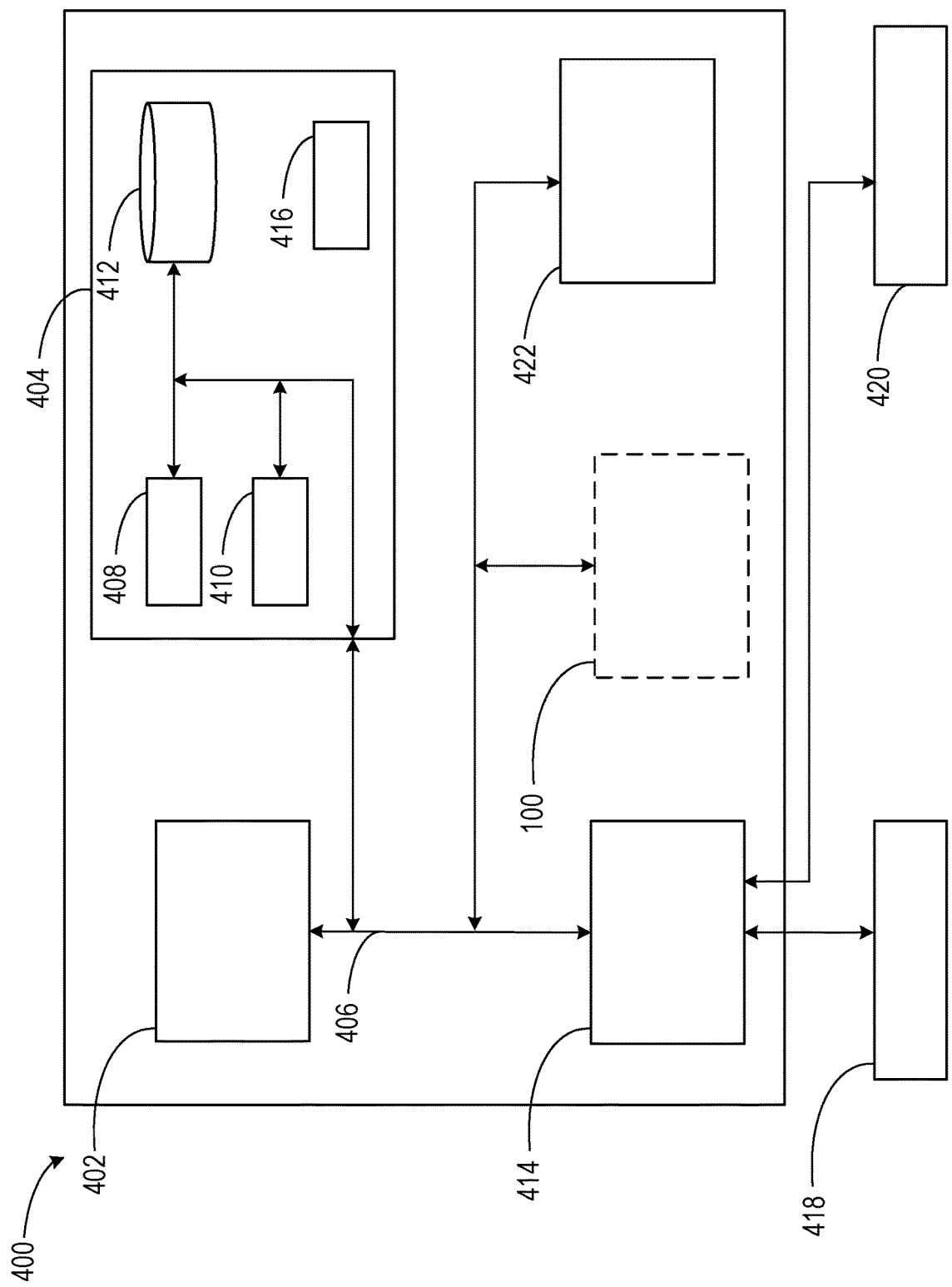
FIG. 4 depicts a block diagram of a computing system for creating step-based answers from multimedia content, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for creating step-based answers from multimedia content.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the interface component 110, the characteristic component 120, the step component 130, the content component 140, the segment component 150, and the answer component 160, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
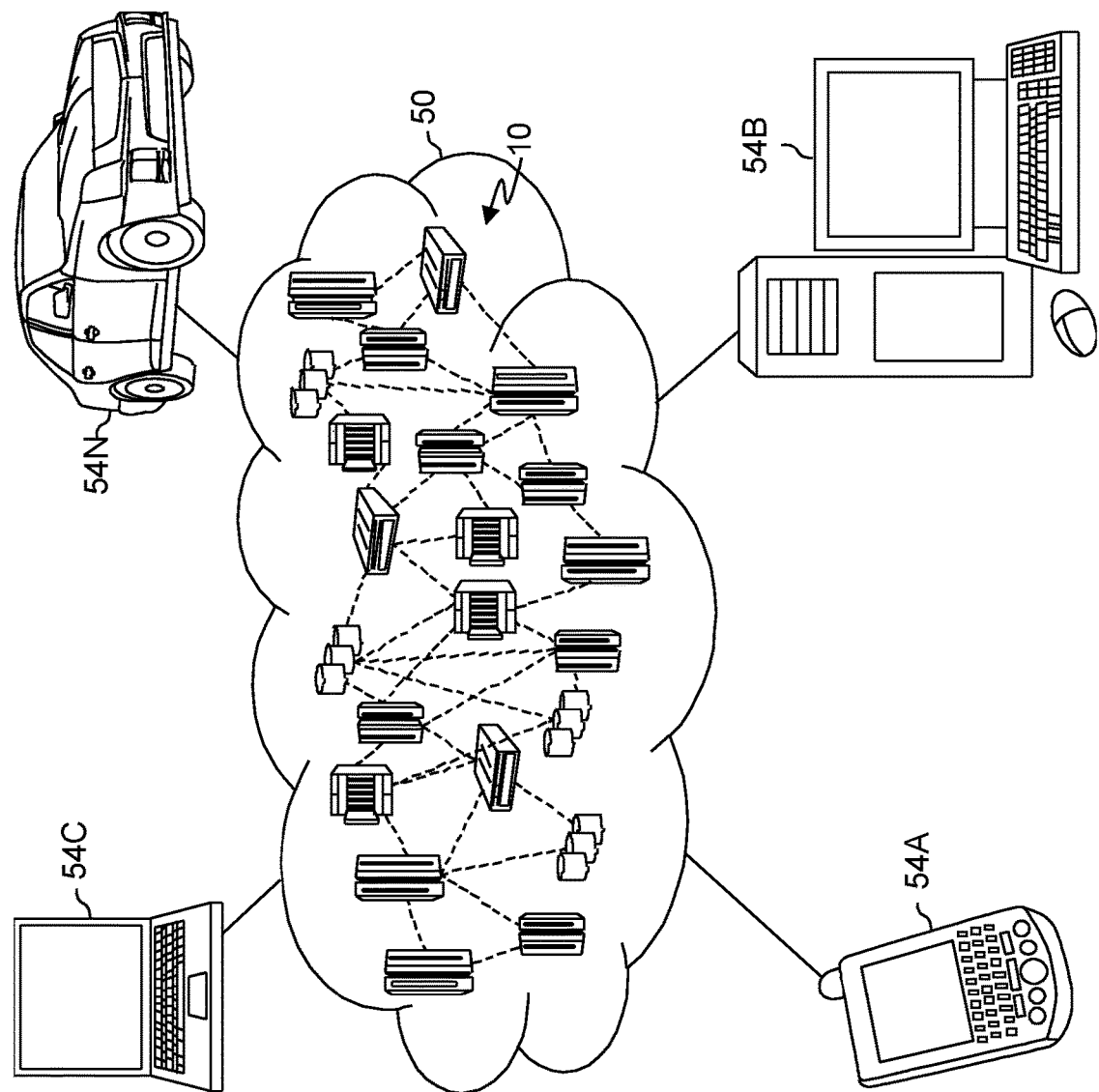
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
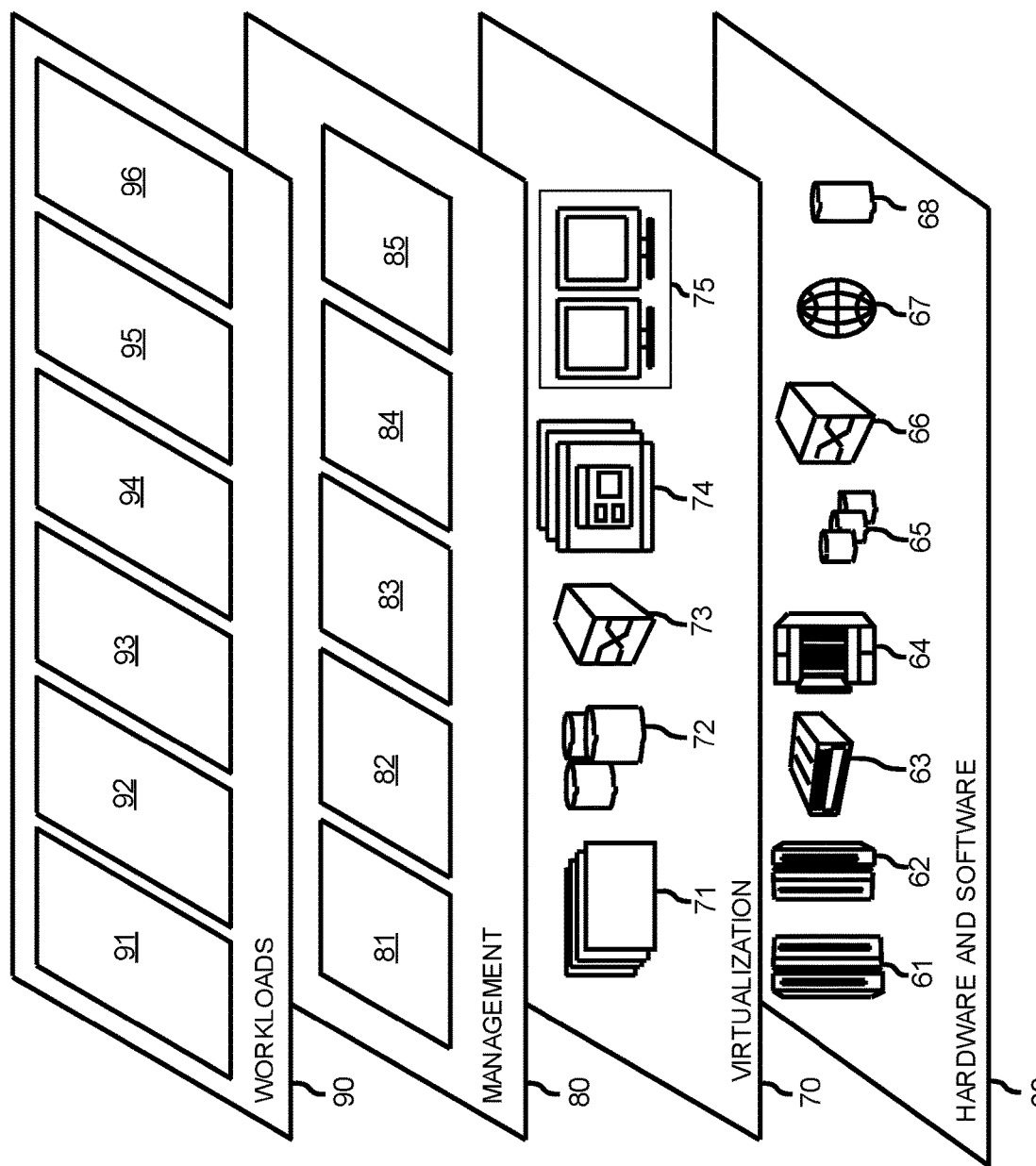
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a search query including a set of search terms, the search query received from a user;
    identifying a profile for the user;
    determining a user skill based on the profile of the user;
    determining a set of question characteristics for the search query, the set of question characteristics based in part on the set of search terms, and the set of question characteristics including a question type;
    generating a topic model based in part on the question type and the user profile;
    generating a set of steps for an answer to the search query, the set of steps generated based in part on the set of question characteristics, the question type, the topic model, and relative to the user skill;
    identifying media content relevant to the set of steps;
    segmenting the media content to generate a set of media segments, each media segment of the set of media segments representing a portion of the media content; and
    combining the set of media segments based on the set of steps to generate a media answer to the search query.

2. The method of claim 1, further comprising:
    mapping the media content to identify relevant portions of the media content by comparing terms within the topic model to a media content repository.

3. The method of claim 2, further comprising:
    assigning each media segment of the set of media segments to a step of the set of steps, each media segment assigned to a step based on the media segment being above a threshold level of relevancy for the step.

4. The method of claim 1, wherein the set of media segments are combined consecutively into a sequence corresponding to an order for the set of steps, the method further comprising:
    presenting the media answer within a user interface, each media segment of the media answer being presented in the sequence corresponding to the order for the set of steps.

5. The method of claim 1, wherein the set of media segments represents a first portion of the media content relevant to the answer to the search query and a second portion of the media content is excluded from the set of media segments, the second portion of the media contents excluded from the media answer.

6. A system, comprising:
    one or more processors; and
    a computer-readable storage medium, coupled to the one or more processors, storing program instructions that, when executed by the one or more processors, cause the one or more processors to perform operations comprising:
        receiving a search query including a set of search terms, the search query received from a user;
        identifying a profile for the user;
        determining a user skill based on the profile of the user;
        determining a set of question characteristics for the search query, the set of question characteristics based in part on the set of search terms, and the set of question characteristics including a question type;
        generating a topic model based in part on the question type and the user profile;
        generating a set of steps for an answer to the search query, the set of steps generated based in part on the set of question characteristics, the question type, the topic model, and relative to the user skill;
        identifying media content relevant to the set of steps;
        segmenting the media content to generate a set of media segments, each media segment of the set of media segments representing a portion of the media content; and
        combining the set of media segments based on the set of steps to generate a media answer to the search query.

7. The system of claim 6, wherein the operations further comprise:
    mapping the media content to identify relevant portions of the media content by comparing terms within the topic model to a media content repository.

8. The system of claim 7, wherein the operations further comprise:
    assigning each media segment of the set of media segments to a step of the set of steps, each media segment assigned to a step based on the media segment being above a threshold level of relevancy for the step.

9. The system of claim 6, wherein the set of media segments are combined consecutively into a sequence corresponding to an order for the set of steps, the operations further comprising:
    presenting the media answer within a user interface, each media segment of the media answer being presented in the sequence corresponding to the order for the set of steps.

10. The system of claim 6, wherein the set of media segments represents a first portion of the media content relevant to the answer to the search query and a second portion of the media content is excluded from the set of media segments, the second portion of the media contents excluded from the media answer.

11. A computer program product comprising a computer readable storage medium having program instructions embodied therewith, the program instructions being executable by one or more processors to cause the one or more processors to perform operations comprising:

receiving a search query including a set of search terms, the search query received from a user;

identifying a profile for the user;

determining a user skill based on the profile of the user;

determining a set of question characteristics for the search query, the set of question characteristics based in part on the set of search terms, and the set of question characteristics including a question type;

generating a topic model based in part on the question type and the user profile;

generating a set of steps for an answer to the search query, the set of steps generated based in part on the set of question characteristics, the question type, the topic model, and relative to the user skill;

identifying media content relevant to the set of steps;

segmenting the media content to generate a set of media segments, each media segment of the set of media segments representing a portion of the media content; and combining the set of media segments based on the set of steps to generate a media answer to the search query.

12. The computer program product of claim 11, wherein the operations further comprise:

mapping the media content to identify relevant portions of the media content by comparing terms within the topic model to a media content repository.

13. The computer program product of claim 12, wherein the operations further comprise:

assigning each media segment of the set of media segments to a step of the set of steps, each media segment assigned to a step based on the media segment being above a threshold level of relevancy for the step.

14. The computer program product of claim 11, wherein the set of media segments are combined consecutively into a sequence corresponding to an order for the set of steps, the operations further comprise:

presenting the media answer within a user interface, each media segment of the media answer being presented in the sequence corresponding to the order for the set of steps.

* * * * *